United States Patent [19]

Noguchi et al.

[11] 4,324,452
[45] Apr. 13, 1982

[54] LIGHT BEAM SCANNING SYSTEM WITH MOTOR AND VIBRATION ISOLATING MEANS

[75] Inventors: Masaru Noguchi; Shigenori Oosaka; Tsuneo Komura, all of Asaka, Japan

[73] Assignee: Fuji Photo Film Co., Ltd., Minami-ashigara, Japan

[21] Appl. No.: 167,227

[22] Filed: Jul. 9, 1980

[30] Foreign Application Priority Data

Jul. 13, 1979 [JP] Japan .......................... 54-96570[U]

[51] Int. Cl.³ .................. G02B 27/17; G02B 7/18; H02K 5/24
[52] U.S. Cl. ........................ 350/6.7; 350/289; 248/638; 310/51
[58] Field of Search ............. 350/6.8, 6.7, 289, 299, 350/310; 248/638, 618, 606, 607; 310/51

[56] References Cited

U.S. PATENT DOCUMENTS

| 2,936,140 | 5/1960 | Copeland | 310/51 |
| 3,317,166 | 5/1967 | Janssen | 310/51 |
| 3,482,127 | 12/1969 | Dochterman | 310/51 |
| 3,782,803 | 1/1974 | Buck | 350/6.8 |

FOREIGN PATENT DOCUMENTS 1416371 12/1975 United Kingdom ................ 310/51

Primary Examiner—Jon W. Henry
Attorney, Agent, or Firm—Fleit & Jacobson

[57] ABSTRACT

A light beam scanning system in which the vibration of a rotating multi-face mirror and a high-speed motor which constitute the light beam scanning means of the system is prevented from being transmitted to other optical components of the system by mounting the rotating multi-face mirror and the high-speed motor on the optical component mounting board through the medium of vibration isolators.

8 Claims, 5 Drawing Figures

LIGHT BEAM SCANNING SYSTEM WITH MOTOR AND VIBRATION ISOLATING MEANS

BACKGROUND OF THE INVENTION

1. Field of the Invention

This invention relates to an improved light beam scanning system.

Light beam scanning systems are comprised of a light beam scanning means constituted of a high-speed motor and a rotating multi-face mirror together with other optical components including, for example, one or more condenser lenses. Such a light beam scanning system is, for example, employed in a light-beam scanning type recording device for scanning a beam of light modulated by the information to be recorded over a recording material.

2. Description of the Prior Art

In conventional light-beam scanning type recording devices, however, it has been necessary for accomplishing high-resolution recording at high speed to rotate a large multi-face mirror at a high rotational velocity. For example, when a 24-faced rotating mirror is used at a duty ratio of 70% to record 4 frames per second, 2,000 lines per frame, 2,600 resolution points per line, it is, when the distance between opposite-facing faces of the rotating mirror is made 120 mm, necessary to rotate the mirror at about 20,000 rpm. When the rotating multi-face mirror is rotated at such a high speed, there inevitably occurs a weight unbalance in the light scanning system due to imprecisions introduced at the time of fabrication of the rotating multi-faced mirror and the motor and at the time of attachment of the multi-faced mirror to the shaft of the motor. The existence of such an unbalance, no matter how slight, will give rise to vibration in the rotating multi-face mirror. The presence of such vibration in the rotating multi-face mirror itself does not, however, necessarily cause jitter in the image since its effect can be eliminated by the use of a linear encoder insofar as the beam incident upon and reflected by the rotating multi-face mirror is a collimated beam at least within the scanning surface. The problem is, however, that the light beam scanning means is mounted on a common optical component mounting plate together with the aforementioned condenser lenses and other optical components so that any vibration in the light beam scanning means is passed on to the other optical elements. As a consequence, these optical components introduce jitter into the light beam which jitter shows up in the image produced.

SUMMARY OF THE INVENTION

The object of the present invention is to provide a light beam scanning system wherein vibration which may occur in the light beam scanning means is prevented from inducing vibration in the other optical components of the light beam scanning system.

The light beam scanning system of the present invention is characterized in that its light beam scanning means is mounted on the optical component mounting plate via vibration isolation means, whereby the vibration of the light beam scanning means is not transmitted to the other optical components.

Various other objects, features and advantages of the present invention will be more apparent by reference to the following detailed description of preferred embodiments thereof taken in conjunction with accompanying drawing as follows:

DESCRIPTION OF THE PREFERRED EMBODIMENTS

Figure 1:
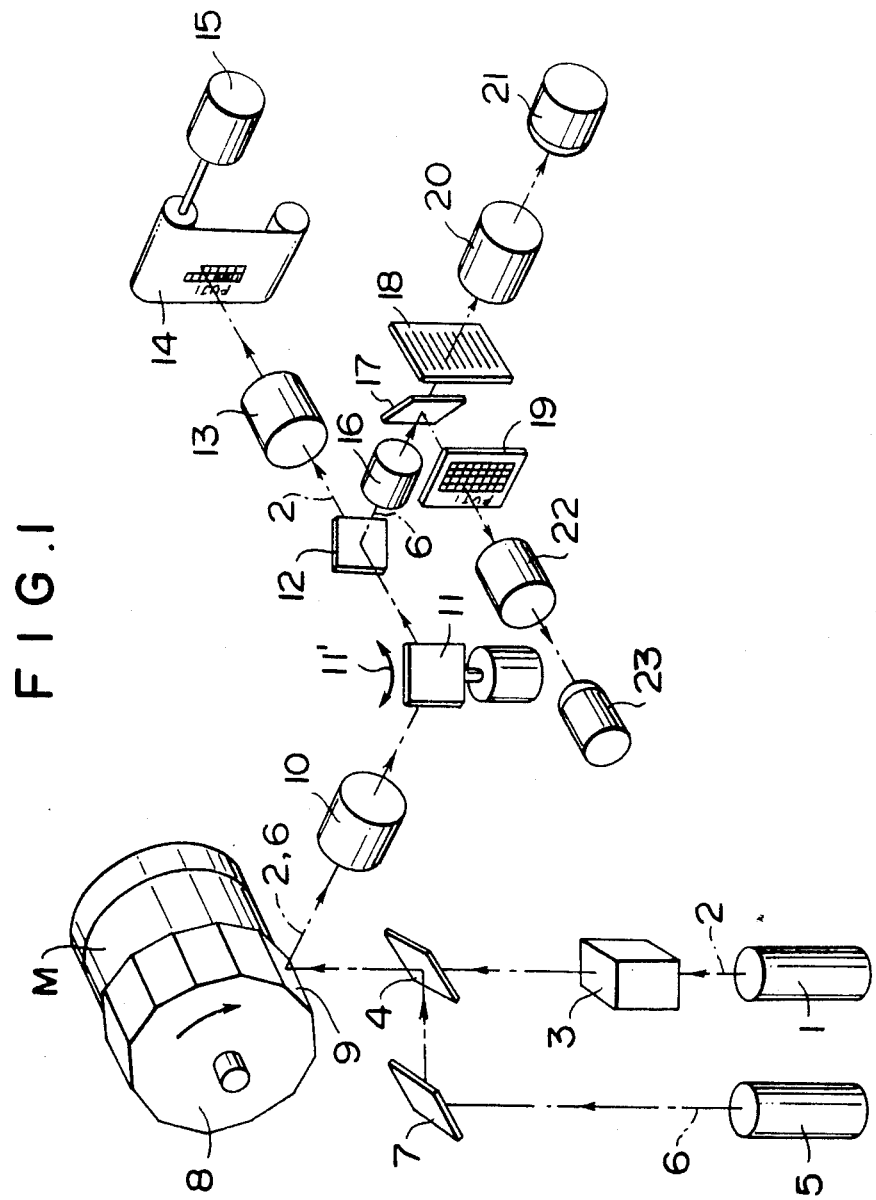
FIG. 1 is a perspective schematic view of a light beam recording system incorporating the light beam scanning system of the present invention.

Referring first to FIG. 1, there is shown a perspective view schematically representing a light beam recording system incorporating the light beam scanning system of the present invention. The optical system of this light beam recording system is constructed so as to first combine a recording laser beam for scanning a recording material and a reading laser beam for scanning a form and a linear encoder, to then subject the combined beam to two-dimensional deflection, and to thereafter separate the combined beam and cause the recording laser beam to scan the recording material and the reading laser beam to scan the form and the linear encoder.

In FIG. 1, the recording laser beam, as indicated by the reference numeral 2, is produced by a laser beam source 1 which may, for example, be an argon ion laser that emits blue and green laser beams. The recording laser beam 2 transits through a light modulator 3 where it is amplitude modulated in accordance with a video signal and then passes through a dichromic mirror 4.

On the other hand, the reading laser beam as indicated by numeral 6, is produced by a laser beam source 5 which may, for example, be a helium-neon laser that emits a red laser beam. The reading laser beam 6 is reflected by a mirror 7, and then by the dichromic mirror 4 to be combined with the recording laser beam 2 and travel along the same path therewith.

The nature of the dichromic mirror 4 is such that it passes the blue and green light beams and reflects the red light beam.

The combined light beams 2 and 6 advance to a reflective surface 9 of a rotating multi-face mirror 8 being rotated in the direction of arrow 8' at a fixed speed (for example, at 20,000 rpm) by a motor M and, after being deflected by the reflective surface 9 (this deflection being hereinafter referred to as "horizontal deflection"), are passed onto a galvanometer mirror 11 by a first light converging optical system 10. The galvanometer mirror 11, which is driven in the well-known manner by a saw-toothed wave signal to vibrate in the direction indicated by arrow 11', deflects the combined light beams 2 and 6 in the direction perpendicular to the horizontal direction (this deflection being hereinafter referred to as "vertical deflection").

For each time the combined light beams 2 and 6 are horizontally deflected by one of the reflective surfaces 9 of the rotating multi-face mirror 8, they are vertically deflected one unit distance by the galvanometer mirror 11. As a result of these deflections, the light beams 2 and 6, after they are finally separated, perform two-dimensional scanning (hereinafter referred to as "raster scanning") by passing along scanning lines on the surface of the scanning surface of, for example, a recording material to be described later.

The combined light beams 2 and 6 deflected by the galvanometer mirror 11 are separated by a dichromic mirror 12. The recording light beam 2 passes through the dichromic mirror 12 and is then converged by a second light converging optical system 13 and passed on to the surface of a recording material 14 where, as a small light spot, it performs raster scanning. When one raster of recording (hereinafter referred to as "one frame") has been completed on the recording material, the recording material is advanced by the distance of one frame by a driving device 15. The particular type of driving device 15 employed is appropriately selected in accordance with the type of recording material 14 and the recording mode (that is, depending on whether the frames are recorded continuously in a single row on a roll of recording material or are two dimensionally recorded in a form like a microfiche.

On the other hand, the reading light beam 6 is reflected by a dichromic mirror 12 and is then condensed by a third light converging optical system and passed on to a half-mirror 17. The portion of the reading light beam 6 that transmits through the half-mirror 17 advances to the surface of a linear encoder 18 where, as a small light spot, it performs raster scanning. The remaining portion of the reading light beam 6 that is reflected by the half-mirror 17 advances to the surface of a form slide 19 having a form consisting of lines or characters drawn thereon where, as a small light spot, it performs raster scanning.

The linear encoder 18 is a flat plate having long, narrow transparent portions and opaque portions extending in the direction of vertical deflection and disposed alternately at equal intervals in the direction of horizontal deflection to produce a pattern consisting of many stripes. As the reading light beam 6 passes over the surface of the linear encoder in raster scanning, it is transmitted by the transparent portions and is blocked by the opaque portions. The portions of the beam 6 transmitted through the linear encoder 18 are passed through a fourth light converging optical system 20 to a light detector 21 which produces a pulse signal A each time the light beam 6 passes through a transparent portion of the linear encoder 18 and impinges thereon.

On the other hand, as the reading light beam 6 passes over the surface of the form slide 19 in raster scanning, it is transmitted by those portions where the form image is present and is blocked by those portions where the form image is not present. The portions of the beam 6 transmitted through the form slide 19 are passed through a fifth light converging optical system 22 to a light detector 23 which produces an ON-OFF signal corresponding to the form image.

The rotating multi-face mirror and the motor M are mounted on an optical component mounting plate P (See FIG. 2) together with such other optical components as the first and second light condensing optical systems 10 and 13. Consequently, any vibration generated by the motor M and the rotating multi-face mirror 8 when, as mentioned above, they are rotated at 20,000 rpm is transmitted via the optical component mounting plate P to the first and second light converging optical systems 10 and 13, causing the first and second light converging optical systems to vibrate as well.

In the present invention, in order to prevent such vibration of the first and second light converging optical systems, the light beam scanning means 24 comprised of the rotating multi-face mirror 8 and the motor 8 is mounted on the optical component mounting plate P through the medium of vibration isolating means.

As vibration insulators suitable for the purpose of this invention, there can be mentioned by way of example those of the type which prevent transmission of vibration through deformation of the isolator material by the energy of the vibration and those of the type which prevent transmission of vibration by absorbing the energy of the vibration and converting it into heat energy. As examples of the former type there can be mentioned leaf-spring and rubber vibration isolators and as examples of the latter type there can be mentioned lead-plate and silent alloy-plate vibration isolators.

Figure 2:
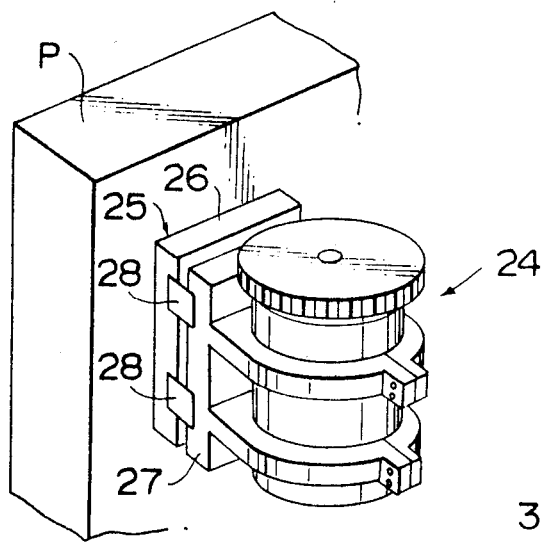
FIG. 2 is a perspective view of a first embodiment of the light beam scanning system of the present invention wherein the light beam scanning means is mounted on the optical component mounting plate by a mount provided with a vibration isolator.

FIG. 2 is a perspective view of a first embodiment of the present invention wherein the light beam scanning means 24 is mounted on the optical component mounting plate P through the medium of leaf-spring vibration isolators.

More specifically, the light beam scanning means 24 is mounted on the optical component mounting plate P via a mount 25 which comprises a fixing plate 26, a bracket 27 for retaining the light beam scanning means 24 and leaf-springs 28 by which the fixing plate 26 and the bracket 27 are joined to each other. Thus, any vibration produced by the light beam scanning means 24 is prevented by the action of the leaf-springs 28 from being transmitted from the light beam scanning means 24 to the optical component mounting plate P and the other optical components. In this first embodiment of the invention, the vibration isolating effect is maximum when the leaf-springs 28 are disposed to have their major surfaces parallel to the rotating shaft of the light beam scanning means 24. This is because the major component of the vibration of the light beam scanning means acts perpendicular to the rotating shaft.

Figure 3:
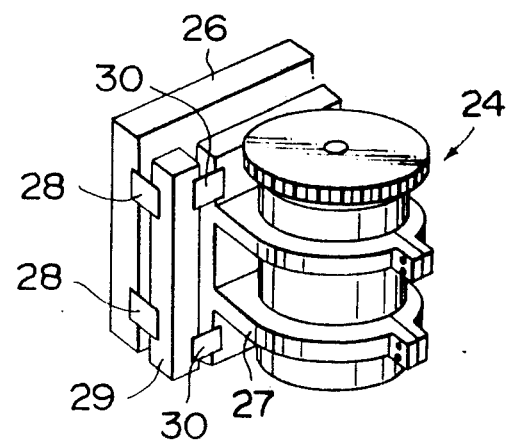
FIG. 3 is a perspective view showing a second embodiment of the present invention.

Although most of the vibration of the light beam scanning means can be absorbed by the structure shown in FIG. 2, the structure does not permit absorption of that component of the vibration which acts perpendicular to the plate P, namely, the component acting in the direction in which the leaf-springs 28 extend. Where it is found necessary to absorb the vertical component as well, the desired results can be obtained by using the second embodiment of the invention shown in FIG. 3. In this embodiment of the invention, intermediate members 29 (only one shown) are disposed between the fixing plate 26 and the bracket 27, with the leaf-springs 28 disposed between the fixing plate 26 and the intermediate members 29 and leaf-springs 30 disposed between the intermediate members 29 and the bracket 27. With this arrangement, any vibration in the direction perpendicular to the plate P is effectively absorbed by the leaf-springs 30. In this second embodiment of the invention, the vibration isolating effect is maximum when the leaf-springs 30 have their major surfaces parallel to both the rotating shaft of the light beam scanning means 24 and the plate P.

Figure 4:
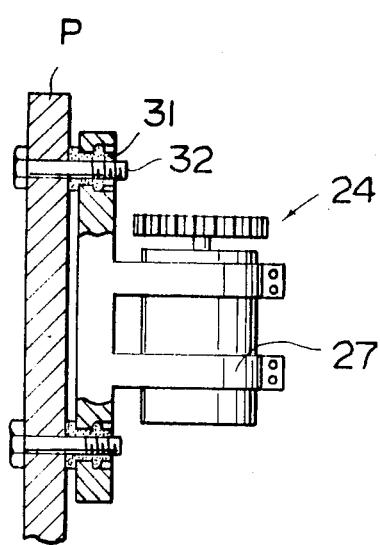
FIG. 4 is a side view, partially in section, of a third embodiment of the present invention.

FIG. 4 is a side view of a third embodiment of the present invention wherein the light beam scanning means 24 is mounted on the optical component mounting plate P through the medium of rubber vibration isolators.

More specifically, the light beam scanning means 24 is mounted on the optical component mounting plate P by means of bolts 32 which connect the bracket 27 retaining the light beam scanning means 24 to the optical component mounting plate P through the medium of rubber bushings 31. Thus, any vibration produced by the light beam scanning means 24 is prevented by the action of the rubber bushings 31 from being transmitted to other parts of the scanning system.

Figure 5:
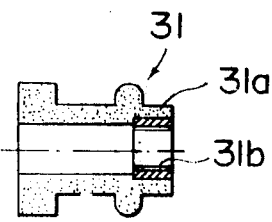
FIG. 5 is a cross-sectional view of an essential part of the third embodiment of the present invention shown in FIG. 4.

FIG. 5 shows the structure of the rubber bushings 31 in detail. This rubber bushing is made by Barry Light Co. and marketed by Showa Wire and Cable Co., Ltd. under the brandname of QUITIGHT and consists of a rubber portion 31a and a nut 31b joined thereto.

Moreover, although not illustrated in the drawing, the vibration of the light beam scanning means 24 can also be prevented from being transmitted to the optical component mounting plate P by mounting the light beam scanning means on the plate through the medium of vibration isolators made of silent alloy plate, lead plate, etc. In such case, the silent alloy plate, lead plate etc. is disposed between the bracket 27 and the plate P.

As has been described above, the light beam scanning system according to the present invention is so constructed that vibration arising in the light beam scanning means is confined to this means and is prevented from being transmitted to the optical component mounting plate on which it is mounted so that the vibration does not reach the light converging optical systems and other optical components of the light beam scanning system. Therefore, when the light beam scanning system of this invention is used in a light beam recording system, the characters, symbols etc. formed by the recording system through light beam scanning are free of jitter and are, as a result, recorded accurately and with a high degree of precision.

We claim:

1. In a light beam scanning system, comprising a light beam scanner including a high-speed motor and a rotating mirror driven by the high-speed motor, said light beam scanner being mounted on a mounting plate, and vibration isolating means for preventing vibration of the light beam scanner from being transmitted through said mounting plate, the improvement wherein said vibration isolating means comprises a bracket for holding said light beam scanner, an intermediate member disposed between said mounting plate and said bracket, and spring means disposed between said mounting plate and said intermediate member, and between said intermediate member and said bracket, for holding said mounting plate, said intermediate member and said bracket together while maintaining vibration isolation therebetween.

2. In a light beam scanning system as defined in claim 1, wherein said vibration isolating means further comprises a fixing plate secured to said mounting plate, said spring means being connected to and between the fixing plate and the bracket.

3. In a light beam scanning system as defined in claim 2, wherein said spring means comprises a plurality of leaf-springs.

4. In a light beam scanning system as defined in claim 2, wherein said spring means comprises at least one first spring connected to and between said fixing plate and said intermediate member, and at least one second spring connected to and between said intermediate member and said bracket.

5. In a light beam scanning system as defined in claim 4, wherein said at least one first and second springs comprise a plurality of leaf-springs.

6. In a light beam scanning system as defined in claim 1, wherein said spring means comprises a plurality of leaf-springs.

7. In a light beam scanning system as defined in claim 1, wherein said spring means comprises at least one first spring connected to and between said mounting plate and said intermediate member, and at least one second spring connected to and between said intermediate member and said bracket.

8. In a light beam scanning system as defined in claim 7, wherein said at least one first and second springs comprise a plurality of leaf-springs.

* * * * *